United States Patent [19]

Takeuchi

[11] Patent Number: 5,562,931
[45] Date of Patent: Oct. 8, 1996

[54] INJECTION MOLDING APPARATUS

[75] Inventor: Hiroshi Takeuchi, Tokyo, Japan

[73] Assignee: Shinko Sellbic Co., Ltd., Tokyo, Japan

[21] Appl. No.: 224,780

[22] Filed: Apr. 8, 1994

[30] Foreign Application Priority Data

Apr. 9, 1993 [JP] Japan .................................. 5-083457
Oct. 5, 1993 [JP] Japan .................................. 5-249565

[51] Int. Cl.⁶ .................. B29B 7/42; B29B 7/82
[52] U.S. Cl. ............ 425/207; 425/378.1; 425/378.2; 425/562
[58] Field of Search ........................ 425/207, 200, 425/378.1, 381, 2, 382.3, 562, 565

[56] References Cited

U.S. PATENT DOCUMENTS 3,355,764 12/1967 Moyer.
3,405,210 10/1968 Heider.
5,387,386 2/1995 Kirjavainen .................. 425/381.2

FOREIGN PATENT DOCUMENTS 2131901 11/1972 France.
1185366 1/1965 Germany.
1288780 2/1969 Germany.
1022321 3/1966 United Kingdom.
2202783 10/1988 United Kingdom ............... 425/376.1

Primary Examiner—Khanh P. Nguyen
Attorney, Agent, or Firm—Wenderoth, Lind & Ponack

[57] ABSTRACT

An injection molding apparatus has a plasticizing space formed in a substantial cone or disk shape between a heating cylinder and a screw, into which molding resin is introduced. The molding resin in the plasticizing space can be maintained in its uniformly plasticized state by continuously rotating the screw during an injection molding operation, thus increasing the efficiency of injection molding. The heating cylinder and screw can readily be assembled because the heating surface of the heating cylinder and the plasticizing surface of the screw are formed in substantial cone or disk shapes.

9 Claims, 7 Drawing Sheets

INJECTION MOLDING APPARATUS

BACKGROUND OF THE INVENTION

1. Field of the Invention

This invention relates to an injection molding apparatus having a unique plasticizing structure capable of constantly maintaining molding resin in its uniformly plasticized state, thereby to produce molded articles of high quality.

2. Description of the Prior Art

There has been so far widely used an in-line screw type injection molding apparatus having a rotating screw movable back and forth in a heating cylinder. Molding material supplied into a plasticizing space defined between the inner surface of the heating cylinder and the circumferential surface of the screw is plasticized with not only the heat essentially generated by the heating cylinder but also shearing calorific stress caused by the rotation of the screw. While feeding out the plasticized material toward the cylinder head, the rotating screw is forced backward by the reaction of the molding material. Then, the screw stops rotating and thrusts forward to inject the plasticized molding material from the cylinder into a mold.

In the conventional injection molding apparatus of this type, the plasticizing space between the inner heating surface of the heating cylinder and the outer surface of the screw is formed in the shape of a thin tube extending parallel with the axis of the cylinder.

In the conventional molding apparatus, the tubular plasticizing space formed in the heating cylinder and extending parallel with the axis of the cylinder entails various problems as described below.

The unit constituted by the heating cylinder and screw in the conventional molding apparatus necessitates a rather long plasticizing passage for the molding material in order to uniformly plasticize the molding material and allow the screw to sufficiently move back and forth in the cylinder. Thus, the conventional molding apparatus is inevitably complicated in structure and made large in size. In particular, as the screw having a feed zone, plasticization zone, and metering zone is necessarily made long, the heating cylinder and injection mechanism in the conventional apparatus become long. As one example, the injection mechanism capable of exerting a mold clamping force of 25 tons has generally a length of about 350 mm to 400 mm, and that capable of exerting a molding clamping force of 200 tons becomes as long as about 1000 mm to 1500 mm in length.

Furthermore, the plasticizing space between the heating cylinder and the screw must be narrowed down to less than 0.02 mm in general in order to allow the screw to move back and forth without degrading plasticizing efficiency. However, the work of inserting the screw into the heating cylinder having an inner diameter slightly larger than the outer diameter of the screw to assemble the molding apparatus turns out to be very onerous. In addition, the metallic heating cylinder and metallic screw which are in close contact with each other is worn out during the course of prolonged service.

Moreover, the screw is disadvantageous in that the plasticizing space is fixedly defined between the cylinder and thus, it cannot be adjusted in accordance with the quality or properties such as viscosity of the molding resin. As a result, the molding resin containing fiberglass or other specific composite resin is rather restricted in size of annexations such as fiberglass and other conditions. When such resin containing fiberglass is continuously dealt with, the screw is easily worn out by as much as about 0.03 mm to 0.15 mm, consequently degrading the plasticizing efficiency.

In addition, since the plasticizing space formed in a tube extends parallel to the rotation axis of the screw, the screw has to stop rotating to cease the plasticization of the molding material, with the result that the molding material to be injected cannot be uniformly plasticized nor injected with a high efficiency.

Besides, since the conventional molding apparatus is generally provided with a check valve near a nozzle in the cylinder head, the injection of the molten resin cannot be stably performed due to different injecting conditions and disturbance. Therefore, in order to perform proper injection molding for obtaining a precise molded article by utilization of the conventional molding apparatus, the injection molding operation has had to be executed while keeping the molding conditions under observation in such a manner that an excessive amount of molding material is constantly supplied so that the molding material can be added at all times in accordance with the cushioning action brought about by the molding material being injected from the plasticizing space into the mold. Thus, supplementary molding material is complementarily supplied according to the amount of the molding material in the plasticizing space, as a result of which a molded article is formed of molding resins different in viscosity, thus causing unevenness on moldings and irregularities in injection shots.

In addition to the aforementioned in-line screw type molding apparatus, there have been conventionally known a plunger type injection molding apparatus using a plunger for injecting molding material heated by a torpedo, a plunger preplasticating type injection molding apparatus having a multi-cylinder structure formed by combining the plunger type and in-line screw type injection molding apparatuses, and a screw preplasticating type injection molding apparatus. However, these conventional molding apparatuses have a common disadvantage of being inefficient in plasticizing the molding material and complicated in structure, and therefore, cannot receive general application.

OBJECT OF THE INVENTION

An object of the present invention is to provide an injection molding apparatus having an improved plasticizing structure free from the disadvantages suffered by the conventional molding apparatus as described above.

Another object of this invention is to provide an injection molding apparatus with a shortened screw and a shortened heating cylinder, capable of being notably made simple in structure, readily assembled, miniaturized without degrading plasticizing efficiency, and easily adjusting a plasticizing space formed between the screw and heating cylinder in accordance with the quality or properties of the molding material.

Still another object of this invention is to provide an injection molding apparatus capable of continuing uniform plasticization of the molding material while injecting the molding material.

SUMMARY OF THE INVENTION

To attain the objects described above according to this invention, there is provided an injection molding apparatus comprising a heating cylinder having a heating surface nonparallel to the axis of the cylinder, and a screw having a plasticizing surface confronting the plasticizing surface of the heating cylinder.

The heating surface of the heating cylinder and the plasticizing surface of the screw are formed aslant relative to the axis of the heating cylinder to define a substantially conical plasticizing space between the heating cylinder and screw.

The heating surface of the heating cylinder and the plasticizing surface of the screw may be arranged perpendicular to the axis of the heating cylinder so as to form a disk-shaped plasticizing space between the heating surfaces of the heating cylinder and the plasticizing surface of the screw.

The heating cylinder has an injection nozzle at the apex of the cone-shaped heating surface, through which molding resin is injected into a mold cavity. The screw is movable back and forth in the direction parallel to the axis of the heating cylinder, and provided with a plunger and sleeve which are movable in the same direction as the screw.

The molding material is supplied into the plasticizing space formed in a substantial cone between the heating cylinder and screw and plasticized with shearing calorific stress produced by forcibly rotating the screw with large rotational torque. The molding material thus plasticized is fed toward the injection nozzle disposed at the apex of the cone-shaped heating surface of the cylinder and gradually compressed in the substantially conical plasticizing space while increasing the density of the molding material.

Then, the molding material fed into the nozzle is injected by the rotation of the screw and the forward movement of the plunger. When injecting the molding material, the sleeve in the screw is moved forward to cut off the plasticizing space, thus preventing the molding resin from flowing backward.

Other and further objects of this invention will become obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

Other objects and features of the present invention will be hereinafter explained in detail with reference to the accompanying drawings, wherein.

DESCRIPTION OF THE PREFERRED EMBODIMENTS

The present invention will become more fully understood from the detailed description given hereinbelow and the accompanying drawings which are given by way of illustration only, and thus are not limitative of the present invention.

The first embodiment of the present invention will be described hereinafter with reference to FIG. 1 through FIG. 4. Although this embodiment adopts a horizontal type injection molding apparatus 10, this invention may of course be applied to a vertical type injection molding apparatus as described later.

Figure 4:
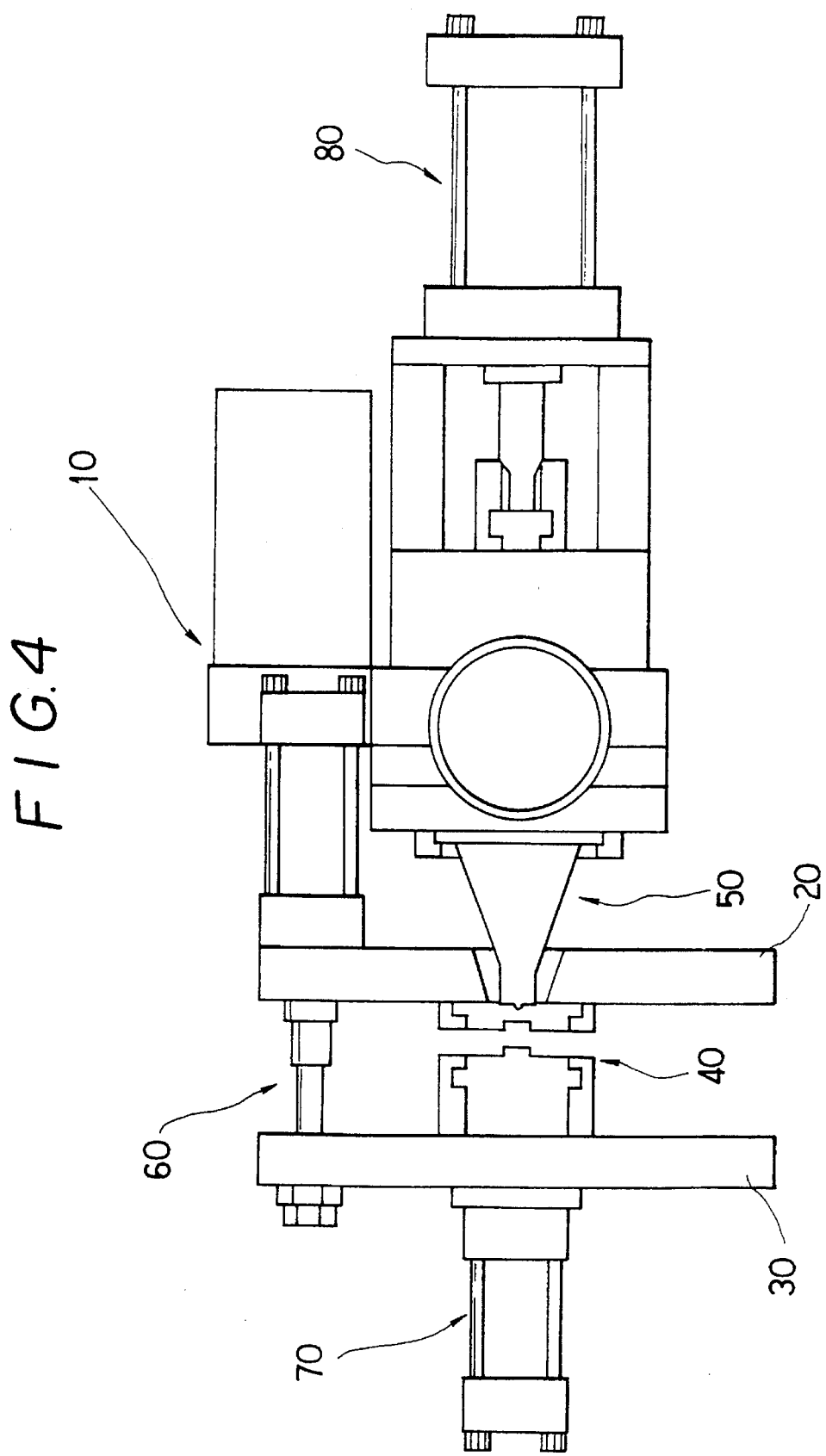
FIG. 4 is a top view showing the apparatus of FIG. 1.

The injection molding apparatus 10 of this embodiment comprises a stationary platen 20, a movable platen 30, a mold unit 40 disposed between the stationary platen 20 and the movable platen 30, an injection mechanism 50 attached to the stationary platen 20, and a mold clamping mechanism 60 attached to the movable platen 30 as shown in FIG. 4. The mold unit 40 is provided on its movable platen side with an ejection mechanism 70. The injection mechanism 50 is provided with an injection unit 80.

Figure 1:
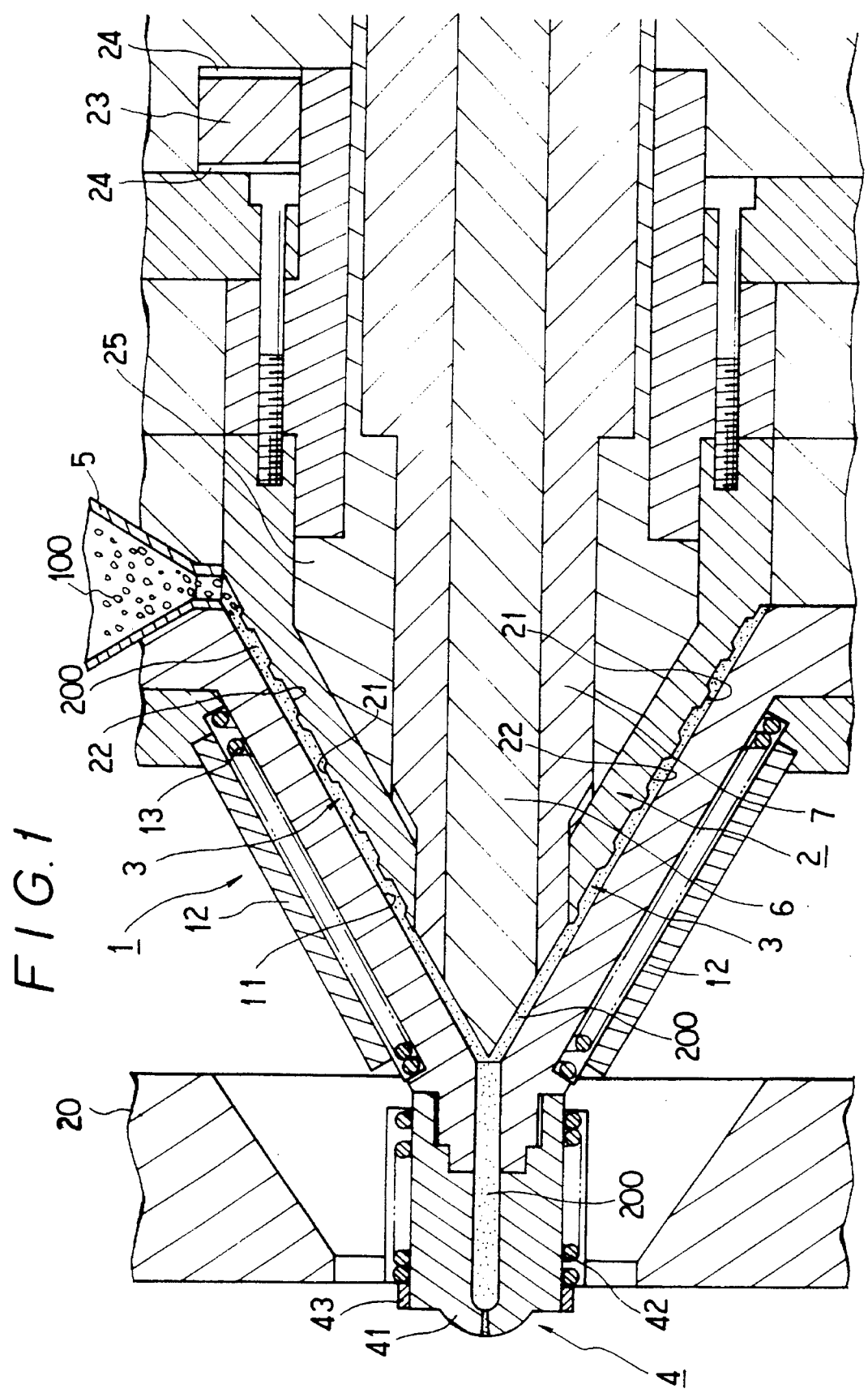
FIG. 1 is a cross section showing the principal portion of a first embodiment of the injection molding apparatus according to this invention.
Figure 2:
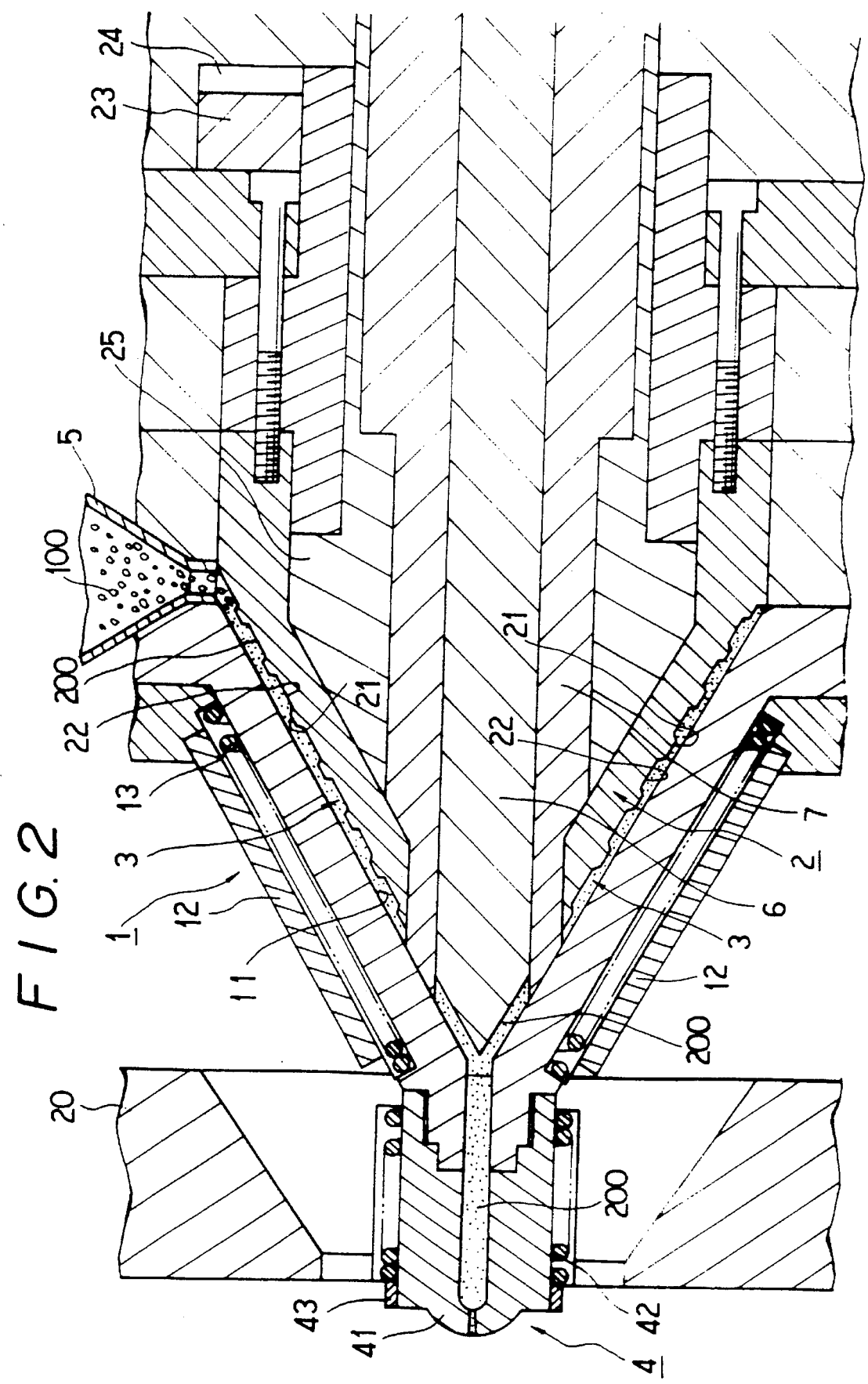
FIG. 2 shows a state in which a sleeve is protruded from a screw in apparatus of FIG. 1.
Figure 3:
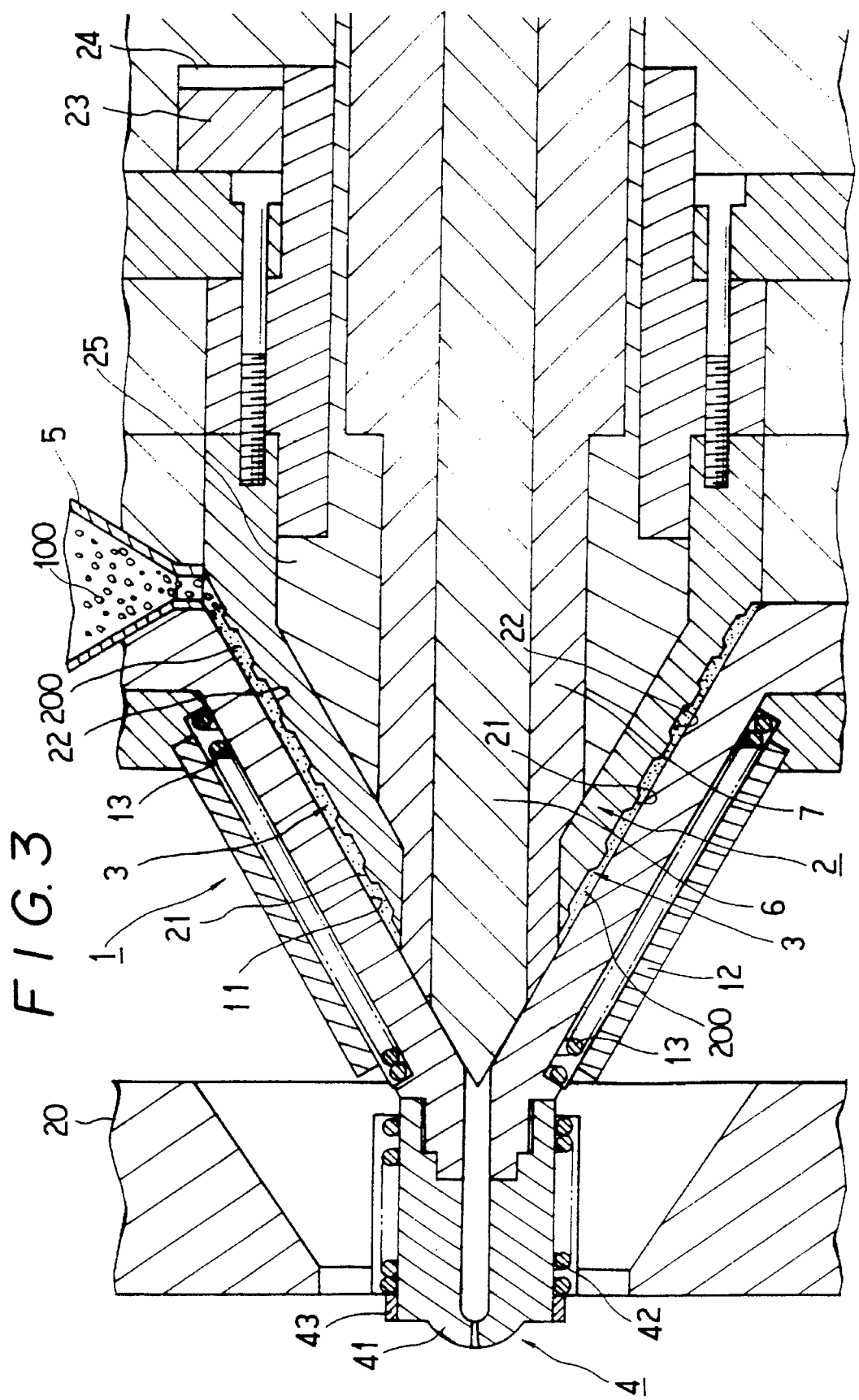
FIG. 3 shows a state in which the sleeve and a plunger are protruded from the screw in the apparatus of FIG. 1.

As shown in FIG. 1 to FIG. 3 in detail, the injection mechanism 50 includes a heating cylinder 1, a screw 2, a plasticizing space 3 defined between the heating cylinder 1 and the screw 2, a nozzle 4, a hopper 5, a plunger 6, and a sleeve 7.

The heating cylinder 1 has a heating surface 11 nonparallel to the center axis thereof. In this embodiment, the heating surface 11 is shaped in a substantial cone having an apex or pointed end leading to the nozzle 4 and a gradually decreasing inner diameter toward the apex. The inclination of the heating surface 11 is determined to about 30° to 150°, preferably 60° to 120°.

The heating cylinder 1 is provided on its outer peripheral surface with a heater 13 held by a heater retainer 12.

The screw 2 has a plasticizing surface 21 nonparallel to the rotation axis thereof which generally coincides with the center axis of the heating cylinder 1. In this embodiment, the plasticizing surface 21 is shaped in a substantial cone gradually decreased in diameter toward its pointed end or apex. The inclination of the plasticizing surface 21 is substantially equal to that of the heating surface 11 of the cylinder 1 so that the screw 2 is fitted into the cylinder 1 with the heating cylinder 1 with the plasticizing surface 21 confronting the heating surface 11.

The screw 2 is provided in the plasticizing surface 21 thereof with at least one spiral groove 22. The screw 2 is driven to not merely rotate about its axis but also move back and forth along the axis within the range defined by a gap 24 around a bearing 23 by a driving means such as an electric motor (not shown). The screw 2 further includes heating means 25 such as a ceramic heater.

In the united heating cylinder 1 and screw 2, the plasticizing space 3 is formed between the substantially cone-shaped heating surface 11 of the cylinder 1 and the substantially cone-shaped plasticizing surface 21 (spiral groove 22) of the screw 2. That is, the shape of the plasticizing space 3 assumes a substantial cone having a gradually decreasing diameter toward its apex. The conical plasticizing space 3 is connected at its apex to the nozzle 4 disposed on the leading end portion of the heating cylinder 1, and at its rear end to the hopper 5 mounted on the cylinder 1.

The nozzle 4 includes a heater 42 and a thermocouple element 43, which are wound around the outer peripheral surface of a nozzle body 41.

The plunger 6 having a substantially conical leading end portion which constitutes the leading end of the screw 2 is held movably in the axial direction of the screw and driven in the screw to move back and forth by means of the aforementioned injection unit 80.

The sleeve 7 disposed around the plunger 6 is also held movably in the axial direction of the screw and driven by the injection unit 80 independent of the plunger 6 so as to cut off or ensure the plasticizing space 3.

Since the heating cylinder 1 and the screw 2 are united along the conical surface like a wedge, the cylinder 1 and screw 2 can be assembled with great ease in comparison with a conventional in-line screw type injection molding apparatus. Furthermore, the plasticizing space 3 defined between the cylinder 1 and the screw 2 need not be made thin precisely because of the plasticizing ability brought about by sufficient rotational torque which will be explained later. The plasticizing space 3 in this embodiment is determined to be about 0.2 mm to 0.6 mm so as not to bring the cylinder 1 and screw 2 into metallic contact with each other.

By moving the screw 2 back and forth within the gap 24, the plasticizing space 3 can be suitably adjusted with ease in accordance with the properties, such as viscosity of molding resin 100. Moreover, since the plasticizing space 3 between the united cylinder 1 and screw 2 is formed aslant relative to the axis of the cylinder 1, the cylinder 1 and screw 2 can be remarkably reduced in length to 1/33 to 1/5 of those in the conventional injection molding apparatus.

Next, the operation of the apparatus in this embodiment will be described.

First, the molding resin 100 is put in the hopper 5 and introduced into the plasticizing space 3 by the rotation of the screw 2 while being heated by the heater 13 of the cylinder 1 and the heater 25 in the screw 2. The molding resin 100 is stirred forcibly by the rotating screw 2, thus acquiring larger shearing calorific stress in the rear-side portion of the plasticizing space 3 at which the circumferential speed of the screw 2 is higher than that at the front-side portion. As a result, the molding resin 100 is molten with the shearing calorific stress and plasticized uniformly with the aid of the heat generated by the heaters 13 and 25.

The molding resin 100 is forwarded toward the nozzle 4 along the plasticizing space 3 while being kept in its uniformly plasticized state. As the molding resin 100 advances toward the apex of the substantially cone-shaped plasticizing space 3, the rotational torque produced by the rotating screw 2 is gradually decreased, but the density of the molding resin 100 is gradually increased because the molding resin forcibly forwarded is converged toward the apex of the conical plasticizing space 3. Thus, the molding resin 200 sent into the nozzle 4 is maintained in its uniformly plasticized state.

After the prescribed amount of plasticized molding resin is fed out through the nozzle 7, the sleeve 4 is pushed forward to cutoff the plasticizing space 3 as illustrated in FIG. 2, and then, the plunger 6 is protruded to inject the molding resin 200 into the mold unit 40 as shown in FIG. 3. Thus, by arbitrarily determining the stroke within which the plunger 6 is protruded, the amount of molding resin can be adjusted precisely. It is also possible to reserve the prescribed amount of molten resin between the leading end of the plunger 6 and the nozzle 4 by positively moving the plunger 6 backward while feeding out the molding resin 200.

Although the plunger 6 is pushed forward to inject the molding resin 200 into the mold after protruding the sleeve 7, the molding resin 200 is prevented from flowing backward by the protruded sleeve 7 to cut off the plasticizing space 3. While being injected, the molding resin 200 remains in its plasticized state, because the screw 2 does not have to stop rotating. Therefore, the injection of the molding resin 200 into the mold can be effectively performed without a break even immediately after carrying out a preceding injection shot.

In a conventional in-line screw type injection molding apparatus, some molding resin should be left in an injection nozzle or near a check valve to fulfill a cushioning function each time an injection shot is performed. However, such a conventional method entails a disadvantage such that the cushioning effect of the molding resin left in the nozzle varies widely.

According to the aforesaid embodiment of this invention, however, only the required quantity of molding resin for one injection shot may be sent out into the nozzle 4. It was confirmed experimentally that, even when 1 cc of molding resin is left in the nozzle 4, such a small quantity of molding resin is completely dissipated in the nozzle 4 and in no way influences an article resultantly produced. Therefore, the injection molding apparatus of this invention is suitable for molding by use of crystalline resins, which are easily pyrolytically decomposed, such as polybutylene terephthalate (PBT) and polyacetal (POM).

For instance, the present molding apparatus having a screw of 60 mm in length and 110 mm in diameter with a spiral groove 22 of 20 mm in width and 3 mm to 4 mm in depth and a plasticizing space determined to have an incline of 34/100 can display compressibility nearly three-times as large as that in the conventional in-line screw type molding apparatus.

Figure 5:
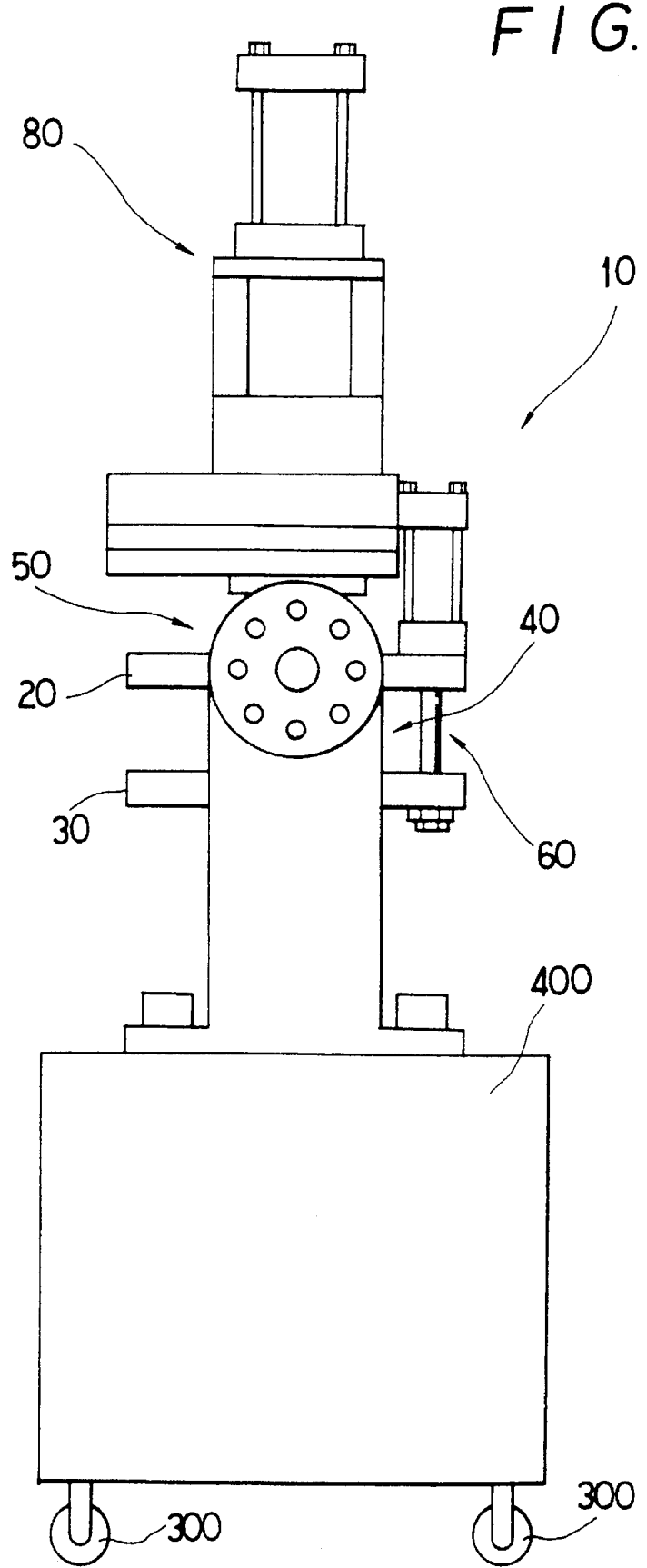
FIG. 5 is a front view showing a second embodiment of the apparatus according to this invention.
Figure 6:
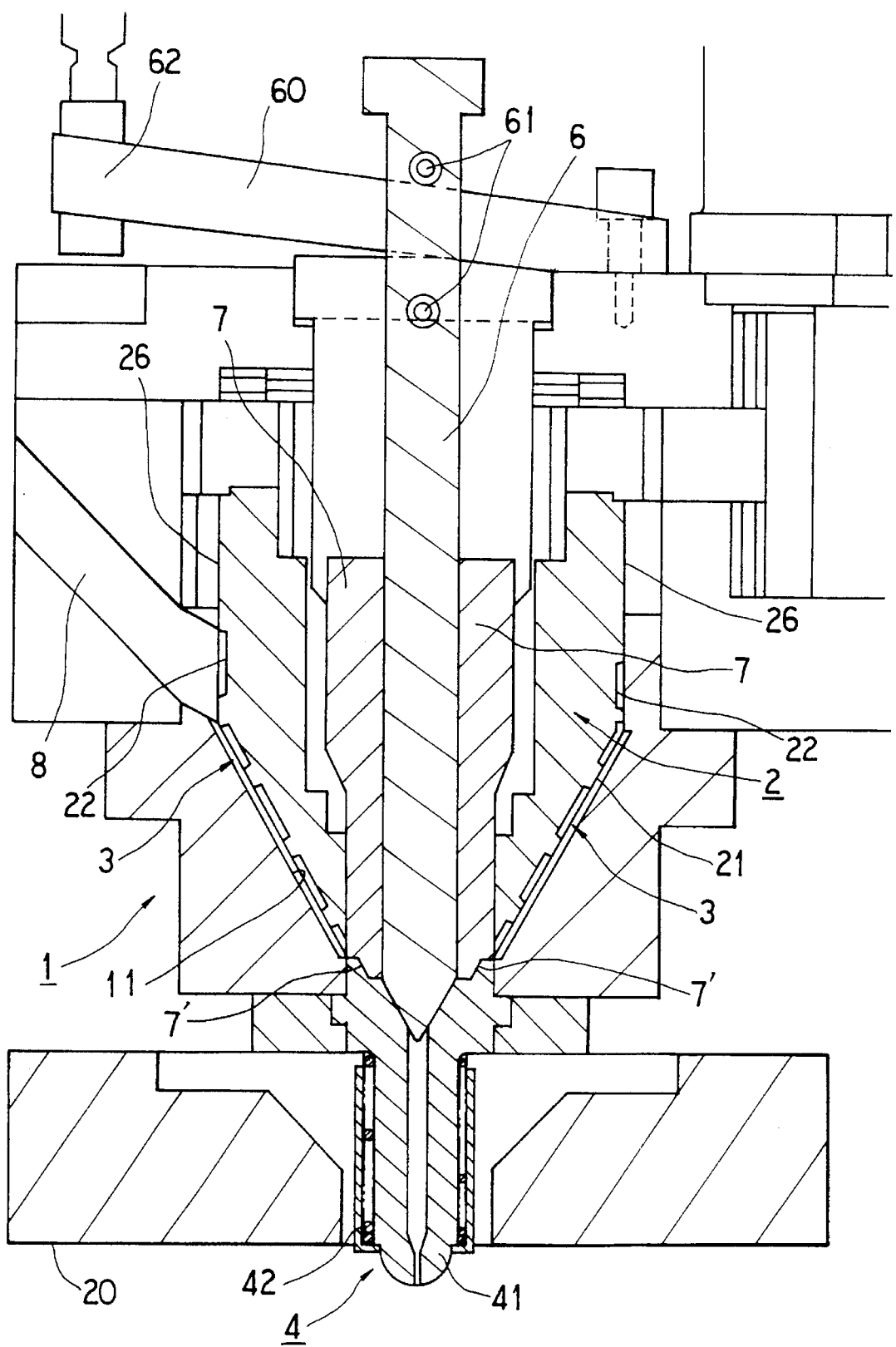
FIG. 6 is a cross section showing a principal portion of FIG. 5.

FIG. 5 and FIG. 6 show the second embodiment of the invention applied to a vertical type injection molding apparatus.

As shown in FIG. 5, the injection molding apparatus of this embodiment is substantially identical with the foregoing embodiment except that the injection mechanism is arranged vertically. In this apparatus, a hydraulic unit including a pump and piping is disposed in a casing 400 having caster wheels 300. Since the injection mechanism is mounted on the movable casing 400, the entire molding system can be made simple and easy to handle and transport.

To be more specific, this injection molding apparatus comprises a mold unit 40, and an injection mechanism 50 disposed on the mold unit and provided with a heating cylinder 1 having a vertically arranged axis.

Since a plasticizing space 3 formed between a screw 2 and the heating cylinder 1 assumes the appearance of a conical funnel having a gradually decreasing diameter toward the apex located at the lower end portion, molding resin which is plasticized by heating means is prevented from staying in the plasticizing space 3, and efficiently forced toward the nozzle 4 by the force of gravity. Therefore, the molding resin can be more uniformly plasticized and effectively injected into the mold unit 40 in comparison with the horizontal type injection molding apparatus in the foregoing embodiment.

In this embodiment, the sleeve 7 has an annular step 7' for reliably cutting off the plasticizing space 3 as shown in FIG. 6. There is formed a spiral groove 22 in not only a conical plasticizing surface portion 21 at the leading end of the screw 2 but also a part of a cylindrical surface 26 parallel to the screw axis so as to connect the plasticizing space 3 with a resin supplying path 8 extending aslant upwards. Thus, the molding resin is smoothly introduced into the plasticizing space 3 and prevented from flowing backward.

A plunger 6 movable vertically is driven by vertically rocking a lever arm 60 engaged with stoppers 61 fixed on the plunger 6.

The result of the experiment which was made for evaluating the present, invention in comparison with the conventional injection molding apparatus of this type will be described hereinbelow.

In the experiment, there was used the injection molding apparatus of this invention exhibiting a mold clamping force of 25 tons, injection capacity of 20 cc, heating temperature of 220° C., measuring time of 1.0 to 1.5 sec., and filling time of 0.5 sec. and having a screw 2 of 60 mm in length, 110 mm in diameter and 200 rpm in rotational speed. The spiral groove 22 of 20 mm in width and 3 mm to 4 mm in depth is formed continuously over the entire length of the screw 2 so as to form a conical plasticizing space 3 having an incline of $^{34}/_{100}$.

As a comparative apparatus, there was used an injection molding machine, model "PROMAT 25t" made by Sumitomo Heavy Industries, Ltd. of Japan, showing a mold clamping force of 25 tons, injection capacity of 20 cc, heating temperature of 220° C., measuring time of 2.2 to 2.3 sec., and filling time of 0.5 sec. and having a screw of 320 mm to 330 mm in length, 20 mm in diameter and 150 rpm in rotational speed. The screw in this conventional apparatus has a spiral groove of 1.5 mm to 4 mm in depth. The depth and shape of the spiral groove vary in each of feed zone, plasticization zone and metering zone.

As a molding material, polypropylene (PP) made by Tokuyama Soda Ace Polymer Co., Ltd. of Japan was used in the experiment, in which a master batch ratio was determined to be 100:1.

Specimens were obtained respectively by slicing moldings resultantly produced to 0.05 mm thickness and examined in color distribution with a microscope magnifying fifty times.

It was evident from the results of the experiment that the injection molding apparatus of the present invention can produce a uniformly molded article of good quality in which coloring matter is moderately distributed throughout. On the contrary, in a molded article produced by the conventional injection molding apparatus, gross uneven stripes of coloring and unfavorable molded portions were found. It can be assumed that the molten resin 200 in the conventional apparatus is injected into the mold without changing its section in the screw groove, but that in the apparatus of this invention is compressed and injected while being twisted in the substantially conical plasticizing space.

It was also confirmed experimentally that the molten resin 200 in the conventional apparatus stays behind in the heating cylinder in one injection shot because the check valve disposed in contact with the heating surface of the heating cylinder is slow in responding. The amount of molten resin which stayed behind in the cylinder in the conventional apparatus was nearly three times as large as that in the present invention.

What should be noted is the fact that the entire injection molding apparatus of this invention could be made notably compact with dimensions of about 1600 mm in height, about 700 mm in frontage and about 600 mm in depth.

Figure 7:
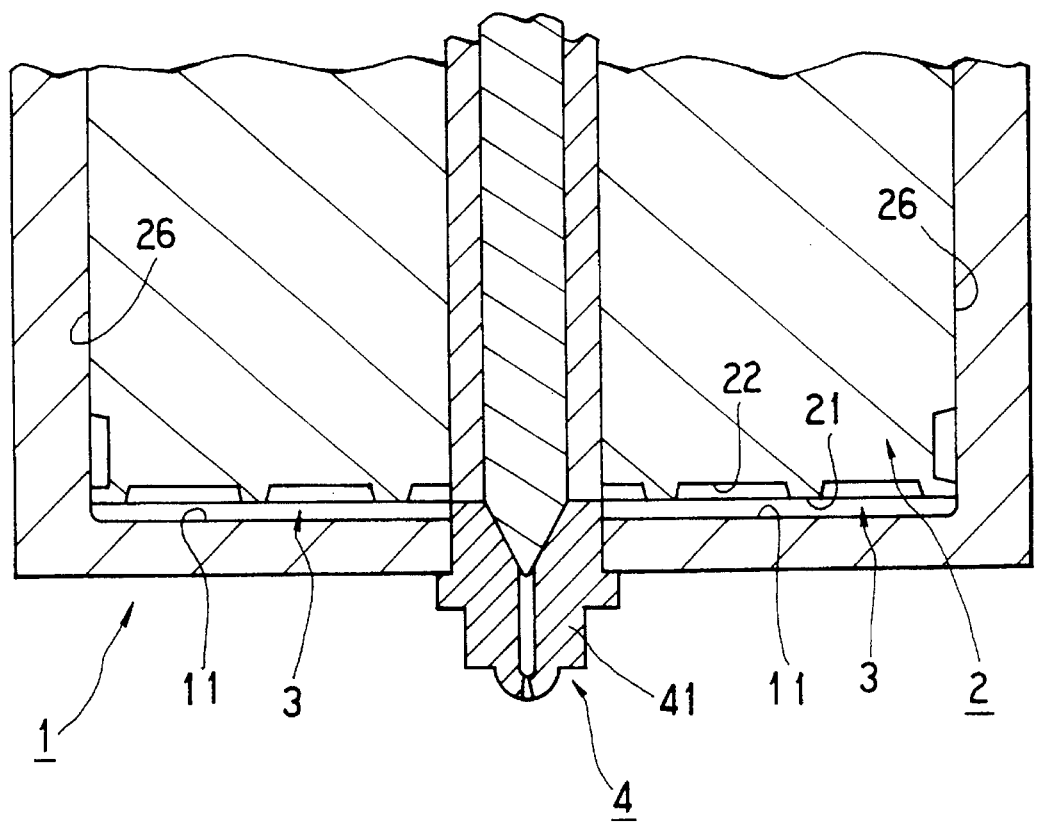
FIG. 7 is a cross section showing a principal portion of a third embodiment of the apparatus according to this invention.

FIG. 7 shows the third embodiment in which a plasticizing space 3 is formed in a circular flat shape like a disk. That is to say, the plasticizing space 3 in this embodiment spreads radially perpendicular to the axis of a heating cylinder 1. This disk-shaped plasticizing space 3 has the same function and effect as those of the foregoing embodiments. The plasticizing space 3 is formed between a flat plasticizing surface 21 on the front end of a screw 2 and a flat heating surface 11 of the heating cylinder 1. In the plasticizing surface 21 of the screw 2, there is formed a spiral groove 22 having an outer peripheral end serving as a resin feeding port. The molding resin is introduced into the plasticizing space 3 and forced toward the center portion leading to a nozzle 4 along the spiral groove 22 while being compressed.

In this embodiment, by rotating the screw 2, the molding resin can be fed into the nozzle 4 without a plunger 6 and sleeve 7 as adopted in the foregoing embodiments.

Since the whole plasticizing surface 21 of the screw 2 which is perpendicular to the axis of the screw 2 imparts a pushing force to the molding resin 200 in the plasticizing space 3, the injection pressure is increased conveniently. In addition, since the molten resin 200 is guided by the spiral groove 22 and the rotating axis 2 produces large stress on the outer peripheral portion thereof, the molding resin flowing into the plasticizing space 3 is no longer fed backward. That is, there is no necessity for providing a check valve or the like for the purpose of preventing the molding resin from flowing backward.

EFFECT OF THE INVENTION

As is apparent from the foregoing description, the injection molding apparatus according to this invention having a unique plasticizing structure in which the plasticizing space defined between the heating cylinder and the screw is aslant or perpendicular to the axis of the cylinder can effectively eliminate various disadvantages suffered by a tube-like plasticizing space appearing in the conventional in-line screw injection molding apparatus. To be more specific, according to this invention, the heating cylinder and screw can be considerably shortened by increasing the plasticizing efficiency. Furthermore, the heating cylinder and screw can readily be assembled by only joining the plasticizing surface on the front end of the screw to the heating surface of the heating cylinder. According to this plasticizing structure, the plasticizing space can easily be adjusted in accordance with the quality or properties of the molding material, and uniform plasticization of the molten resin can be maintained constantly during the injection molding operation, thus greatly increasing the efficiency of continuous injection.

Since the injection molding apparatus according to this invention has no need for a check valve, the molding resin staying behind in the plasticizing space can be decreased in quantity. Besides, the molding resin to be injected into the mold can be precisely measured by operating the plunger and sleeve.

By arranging the plasticizing structure according to this invention vertically, since the molten resin is forced downward by the force of gravity, the efficiency of plasticizing and injecting the molten resin can be remarkably increased.

It is to be understood that the invention is not limited in its application to the details of construction and arrangement of parts illustrated in the accompanying drawings, since the invention is capable of other embodiments and of being practiced or carried out in various ways. Also it is to be understood that the phraselogy or terminology employed herein is for the purpose of description and not of limitation.

What is claimed is:

1. An injection molding apparatus comprising:
   a heating cylinder having a central axis and an inner heating surface which is conically shaped and faces inwardly;
   a screw having a rotation axis and an outwardly facing plasticizing surface, said plasticizing surface being of a conical shape which is substantially complementary with said inner heating surface of said heating cylinder;

wherein said screw is axially movably mounted in said heating cylinder such that said plasticizing surface of said screw confronts said inner heating surface of said heating cylinder and an adjustable conical plasticizing space is defined between said plasticizing surface of said screw and said inner heating surface of said heating cylinder;

wherein said conical plasticizing surface of said screw is provided with spiral grooves; and wherein said screw includes a main screw body and a plunger axially movably mounted relative to said main screw body, such that said main screw body and said plunger are respectively independently axially movable relative to said heating cylinder.

2. An injection molding apparatus as recited in claim 1, wherein said screw further includes a sleeve axially movably mounted relative to Said main screw body and said plunger, such that said main screw-body, said plunger and said sleeve are respectively independently axially movable relative to said heating cylinder.

3. An injection molding apparatus as recited in claim 2, wherein said conical plasticizing surface of said screw comprises a conical end surface of said main body of said screw, a conical end surface of said plunger of said screw, and a conical end surface of said sleeve of said screw.

4. An injection molding apparatus as recited in claim 2, wherein said plunger, said sleeve and said main screw body are mounted in a telescopic arrangement.

5. An injection molding apparatus as recited in claim 1, wherein said conical plasticizing surface of said screw comprises a conical end surface of said main body of said screw, and a conical end surface of said plunger of said screw.

6. An injection molding apparatus as recited in claim 1, wherein said plunger and said main screw body are mounted in a telescopic arrangement.

7. An injection molding apparatus comprising:

a heating cylinder having a central axis and an inner heating surface which is conically shaped and faces inwardly;

a screw having a rotation axis and an outwardly facing plasticizing surface, said plasticizing surface being of a conical shape which is substantially complementary with said inner heating surface of said heating cylinder;

wherein said screw is axially movably mounted in said heating cylinder such that said plasticizing surface of said screw confronts said inner heating surface of said heating cylinder and an adjustable conical plasticizing space is defined between said plasticizing surface of said screw and said inner heating surface of said heating cylinder;

wherein said screw includes a main screw body, a plunger axially movably mounted relative to said main screw body and a sleeve axially movably mounted relative to said main screw body and said plunger, such that said main screw body, said plunger and said sleeve are respectively independently axially movable relative to said heating cylinder, said sleeve being mounted about said plunger.

8. An injection molding apparatus as recited in claim 7, wherein said conical plasticizing surface of said screw comprises a conical end surface of said main body of said screw, a conical end surface of said plunger of said screw, and a conical end surface of said sleeve of said screw.

9. An injection molding apparatus as recited in claim 7, wherein said plunger, said sleeve and said main screw body are mounted in a telescopic arrangement.

* * * * *